(12) United States Patent
Scherer et al.

(10) Patent No.: US 7,749,636 B2
(45) Date of Patent: Jul. 6, 2010

(54) FUEL CELL ARRANGEMENT AND METHOD OF MANUFACTURING A FUEL CELL ARRANGEMENT

(75) Inventors: Joachim Scherer, Ulm (DE); Bernd Gaugler, Ulm (DE); Lothar Quick, Nersingen (DE)

(73) Assignee: Reinz-Dichtungs-GmbH, Neu-Ulm (DE)

( * ) Notice: Subject to any disclaimer, the term of this patent is extended or adjusted under 35 U.S.C. 154(b) by 646 days.

(21) Appl. No.: 11/231,465

(22) Filed: Sep. 21, 2005

(65) Prior Publication Data

US 2006/0105221 A1 May 18, 2006

(30) Foreign Application Priority Data

Sep. 21, 2004 (DE) ........................ 10 2004 046 367

(51) Int. Cl.
*H01M 2/08* (2006.01)
(52) U.S. Cl. .................... 429/36; 427/115; 429/210; 429/457; 429/460; 429/469
(58) Field of Classification Search ................. 429/210, 429/36; 427/115
See application file for complete search history.

(56) References Cited

U.S. PATENT DOCUMENTS 6,861,171 B1 * 3/2005 Suzuki ..................... 429/34

2002/0022170 A1 2/2002 Franklin et al.
2004/0023090 A1 * 2/2004 Pearson et al. ............. 429/30
2005/0031933 A1 * 2/2005 Blunk et al. ............... 429/35

FOREIGN PATENT DOCUMENTS

| DE | 27 31 512 | 1/1979 |
| DE | 43 14 745 | 12/1994 |
| DE | 198 23 880 | 12/1998 |
| DE | 198 29 142 | 1/2000 |
| DE | 199 26 027 | 11/2000 |
| EP | 0 918 362 | 5/1999 |

OTHER PUBLICATIONS

English Abstract for DE4314745.
English Abstract for DE19926027.
English Abstract for DE19829142.

* cited by examiner

*Primary Examiner*—Jane Rhee
(74) *Attorney, Agent, or Firm*—Marshall & Melhorn, LLC

(57) ABSTRACT

The present invention relates to a fuel cell arrangement, containing at least one bipolar plate layer (1) and an bonding partner—preferably an membrane electrode assembly (MEA) (5), wherein the bonding partner is bonded onto the bipolar plate layer (1) with a pressure-sensitive adhesive or a physically bonding adhesive, which are located on a three-dimensional sealing structure of the bipolar plate layer and/or edge region of the bipolar plate layer adjacent thereon.

27 Claims, 3 Drawing Sheets a)

b)

c)

d)

e)

FUEL CELL ARRANGEMENT AND METHOD OF MANUFACTURING A FUEL CELL ARRANGEMENT

RELATED APPLICATIONS

This application claims priority to German Application No. DE 10 2004 046 367.0, filed Sep. 21, 2004.

BACKGROUND

Fuel cell arrangements with at least one bipolar plate layer and at least one electrolyte membrane typically form a fuel cell stack of several fuel cells connected in series, or a part of such a fuel cell stack. Usually a fuel cell stack is manufactured by way of a repetitive joining together of bipolar plates and electrolyte membranes in an alternating sequence, wherein sealing layers may be additionally provided. Multi-layered arrangements which apart from an electrolyte membrane—for example a polymer electrolyte membrane—in the restricted context of the word, may also comprise catalyser layers, electrodes and/or gas diffusion layers which bear on this, are also to be indicated as electrolyte membranes in the present document (such an arrangement which comprises at least one electrolyte membrane is also called an membrane electrode assembly and in particular is occasionally abbreviated as MEA hereinafter). The bipolar plates which are arranged in a fuel cell stack between adjacent electrolyte membranes serve for the creation of an electrical contact between adjacent fuel cells, for the transport of incoming and outgoing reactants or reaction products and typically also for the discharge of reaction heat, for example with the help of coolant channels integrated into the bipolar plates, as well as for sealing the adjacent fuel cells or electrolyte membranes in their edge regions and the active surface. {PRIVATE}

Since electrolyte membranes are mostly fragile and supple, they are difficult to handle on manufacture of a fuel cell arrangement or a fuel cell stack. Difficulties in particular result with an exact positioning of an electrolyte membrane on a bipolar plate which was previously assembled on the stack, and thus related to this, with a sealing of a fuel cell arrangement between a bipolar plate and the electrolyte membrane adjacent thereon. On account of the difficulty of positioning an electrolyte membrane precisely on the bordering bipolar plate, an assembly of a conventional fuel cell arrangement with several fuel cells is furthermore very complicated with regard to automation, which is disadvantageous with regard to mass manufacture.

Typically, fuel cell arrangements of the known type according to the state of the art are therefore manufactured by way of layering bipolar plates and electrolyte membranes onto one another in an alternating sequence, wherein a fuel cell stack which thus arises may be held together for example by way of a mutual clamping of two end plates. Such a manufacturing method entails the disadvantages of the difficult handling of supple electrolyte membranes on assembly of a fuel cell stack and of the likewise difficult realisation of adequately good sealing between adjacent layers.

According to the state of the art, in the case of graphitic bipolar plates, it is likewise known by way of using reactively curing adhesives, cross-linking thermally or under the effect of moisture, to bond bordering electrolyte membranes onto the bipolar plate or to bond these between two bipolar plates. Although a good sealing is achieved with this, difficulties however arise by way of the fact that a cross-linking of the applied adhesive must be externally induced, typically by way of a thermal treatment. With this, damage to the temperature-sensitive electrolyte membranes which for example may contract, dry out or tear on account of this, is very difficult to avoid. Adhesives curing under the effect of moisture or by reactive gases (carbon dioxide for example) also do not simplify the manufacture, since the bonding layer between an electrolyte membrane and a bordering bipolar plate is situated at a difficultly accessible location, and therefore may be subjected to moisture only with great difficultly and/or not in adequately complete and homogenous manner. A manufacture of a fuel cell arrangement with the use of such adhesives furthermore demands an enormous amount of expense with regard to time, since with this, the adjacent bipolar plates and electrolyte membranes must be held under compressive stress for a relatively long period of time. An assembly of a fuel cell stack has been shown to be even more cumbersome. In particular, an automated assembly of fuel cell stacks is therefore at least too time-consuming with fuel cell arrangements according to the state of the art—certainly with large production numbers which are industrially relevant.

SUMMARY

It is therefore the object of the invention to develop a fuel cell arrangement which permits the described disadvantages to be circumvented, in that it may be manufactured in a simpler manner and for its part is suitable for a simplified manufacture of a fuel cell stack. It is further the object of the invention, apart from corresponding fuel cell stacks, to suggest a simple and thus, as the case may be, also at least partly automated method for the manufacture of such fuel cell arrangements and fuel cell stacks, wherein in particular one is to ensure a good sealing between adjacent layers with these fuel cell arrangements.

According to the invention, this object is achieved by the subject-matter of the independent claims.

Advantageous embodiments and formations of the invention are to be deduced from the features of the dependent claims.

The subject-matter of one independent patent claim is a fuel cell arrangement, containing at least one bipolar plate layer and a bonding partner, wherein the bonding partner is bonded onto the bipolar plate layer with a pressure-sensitive adhesive or a physically bonding adhesive, said adhesives being located on a three-dimensional sealing structure of the bipolar plate layer and/or edge regions of the bipolar plate layers adjacent thereon.

With regard to the "bonding partner", here it is preferably the case of an electrode membrane assembly or a bipolar plate/bipolar plate layer. According to the invention "bonding partner" apart from these two specific embodiments is also to be understood as a component which has the following properties:

a component which is adjacent to the bipolar plate coated with adhesive;

which itself has no adhesive on the side which faces the bipolar plate coated with adhesive;

which may form a bonding connection with the bipolar plate coated with the adhesive;

which itself may have, but does not have to have an adhesive, on the side which is distant to the bipolar plate coated with adhesive.

The invention is thus adapted exactly to the various tasks and properties of a sealing for fuel cells. Specifically, here it is the task on the one hand of providing for a simple assembly of the individual layers and furthermore of preventing an exit of medium in any case. On the other hand it is demanded from the sealing to provide an elasticity or tolerance compensation and a compensation of surface roughness.

The solution according to the invention here suggests a completely new path. The bonding connection disclosed here should be simple to manufacture and environmentally friendly. No reactive crosslinking is required with the adhesives according to the invention. The joining here is effected by a "bonding" of molecule chains to the surface, for example by way of van-der Waals forces. Practically no chemical "curing" occurs, i.e. crosslinking of the adhesive on building up the bonding connection. Furthermore, it is advantageous for these joining procedures to be carried out without the external supply of energy, as this could otherwise be necessary with melt adhesives. For this reason, according to the invention, it is essentially the physically bonding adhesives, in particular the pressure-sensitive adhesives which are used. These adhesives with regard to the sealing effect, here permit only a compensation of surface roughness.

The main property of a sealing, elasticity and tolerance compensation here however is assumed by the three-dimensional sealing structure and not be the bonding itself. It is particularly the elasticity which may not be achieved by the pressure-sensitive adhesives according to the invention, so that a suitable three-dimensional sealing structure which has elastic properties is necessary for the tolerance compensation. With regard to the "three-dimensional sealing structure", what is important here is that a spatial structure differing from a rectangle is given in the cross section of this sealing structure (cross section perpendicular to the plate plane). Thus here it is not the case of a "simple" flat seal. The seal is therefore elastic and serves for tolerance compensation. The adhesive serves exclusively for the material-fit connection to the bonding partner. The elastic sealing structure as well as the deposition of adhesive arise or are effected independently from each other and from the creation of the bonding connection, and by way of this it becomes possible to match or set compensating sealing and bonding/adhesive functions independently from one another.

The thickness of the adhesive layer is preferably 1 to 50 µm, particularly preferably 5 to 30 µm. It is particularly advantageous for the adhesive to contain a rubber and/or an undercured rubber and/or a rosin. It is also worth mentioning that a deposition of the adhesive onto the three-dimensional sealing structure may also mean that the adhesive is deposited on the side of the bipolar plate which lies opposite to the sealing structure.

With regard to the invention, it is also worth mentioning that the adhesives deposited in a fluid manner represent something different for example to "adhesive/bonding tapes". The fluid deposition of adhesive means that one does not need to punch an extra layer (as with adhesive tapes) into the desired shape, nor does it need to be stored, fed, free of a protective film, positioned and bonded on. All these costly steps would render an automation process more difficult.

The present invention departs significantly from the state of the art. Until now, the man skilled in the art of fuel cells has strived to achieve the function of "sealing" by way of gluing. Usually he desires to save an additional sealing by way of this. For this, until now, one has used methods with which as strong as possible connections arise and which on account of this are as sealed/tight as possible (above all by way of reactively curing adhesives, induced by way of moisture, e.g. superglue, acrylates and/or heat, e.g. silicones, epoxy resins, and/or with which a certain elasticity is maintained by way of foamed substrate film, i.e. double-sided adhesive tapes). Here, this is not the case, since in a very targeted manner, on the one hand the adhesive creates the bonding connection and on the other hand the elastic tolerance compensation is achieved by the elastic sealing structure according to the invention.

The fuel cell arrangement according to the invention thus contains a bipolar plate or bipolar plate layer with a three-dimensional sealing structure which is at least present in the edge region, wherein the three-dimensional sealing structure and/or edge regions of the bipolar plate which are adjacent thereto are coated with a pressure-sensitive adhesive or physically bonding adhesive.

With such a bipolar plate or bipolar plate layer as a starting point, one may then easily construct the fuel cell arrangements according to the invention.

A difficult handling of supple electrolyte membranes on assembly of a fuel cell stack according to the invention may be avoided in that the electrode membrane assembly (MEA) with a fuel cell arrangement containing at least one bipolar plate layer and one electrode membrane assembly is bonded on with a pressure-sensitive adhesive or a physically bonding adhesive. Thus a construction results with which between the MEA and the bipolar plate layer, at least in regions, there is arranged a layer of the corresponding adhesive which holds these together. Thus at the same time a very good sealing with regard to the exit of gas or fluid exit between the MEA and the bipolar plate layer is achieved. For achieving these advantages, the MEA in the first case may be bonded onto the bipolar plate layer with a pressure-sensitive adhesive or with a physically bonding adhesive.

An influencing of the bonding layer for inducing a crosslinking reaction, which is disadvantageously costly and difficult to realise, is rendered superfluous also with the use of a pressure-sensitive adhesive or a physically bonding adhesive for bonding the MEA onto the bipolar plate layer. With this, it may e.g. be the case of a permanently sticky adhesive which may be deposited onto the MEA and/or onto the bipolar plate layer, in order there to form a bonding layer similar to the surface of an adhesive strip. Such a pressure-sensitive adhesive with preferred embodiments of the invention may consist of mixtures of rubbers and rosins (so-called tackifiers) or of a so-called undercured rubber, wherein synthetic and natural rosins are considered as tackifiers. With this, natural and synthetic rubbers, polyacrylates, polyesters, polychloroprenes, polyvinyl ether and/or polyurethanes and/or flouropolymer rubbers may be used as base polymers, to which rosins such as in particular modified natural rosins—for example colophony—and/or artificial rosins, for example polyester modified rosins, phenol rosins—as well as softeners and/or antioxidants may be added.

It is envisaged for the bipolar plate layer in the edge region to have a three-dimensional sealing structure on a side facing the electrolyte membrane. Such a sealing structure may serve for achieving an improved sealing to the adjacent electrolyte membrane and furthermore as a tolerance compensation, by way of which different thickness of a bordering electrolyte membrane and thermally caused expansion and shrinkage of a stack formed of at least one corresponding arrangement may be compensated. In order to fulfil these tasks, in particular metal beads which may be realised by way of a suitable embossing or shaping of the bipolar plate layer, elastomer beads and/or molded elastomer seals such as seals lip are suitable for example. The elastomer beads or molded seals may at the same time in particular be manufactured of rubber.

It may be envisaged for the three-dimensional sealing structure to be partly deformed in the finished fuel cell arrangement, in order to fulfil the sealing function. For this, the seal may for example be accommodated in a recess such as a groove for example. On assembly then two surfaces of the MEA and bipolar plate layer which border one another may come into contact in edge regions, wherein the seal recedes to a corresponding extent. The three-dimensional sealing structure is particularly suitable as a tolerance compensation when it is elastic within certain limits. Depending on how greatly the sealing structure is deformed in the finished fuel cell arrangement or is pressed into the MEA, one may envisage a bonding connection only existing on prominences of the sealing structure or however over the whole surface in the edge region of the bipolar plate layer, for which the adhesive may accordingly be deposited onto prominences of the sealing structure and/or in the edge region, over the whole surface.

As an adhesive, one may particularly use an adhesive crosslinking in a substrate bonding manner but not an adhesive, reactively curing in an adhesive manner. With this, in the present document, preferably in the strict sense of the word, during the formation of the bonding connection, a non-curing material is to be indicated as an adhesive. Furthermore, an adhesive which after the application to a substrate and after the build up of the bonding to this substrate, said bonding under circumstances itself having come into being by way of a cross-linking reaction (substrate bonding), is still capable of assuming a further bonding connection to a bonding partner, wherein the latter mentioned adhesive connection is a pure pressure-sensitive connection or comes into being by way of physical bonding without energy, moisture and/or reactive gases have to be supplied from the outside, or generally a further chemical reaction (curing) being necessary for the adhesive effect to the bonding partner.

In order to realise a manufacture of a fuel cell arrangement of the described type with as little expense as possible, and at the same time to ensure that quantities of adhesive which are defined as accurately as possible are applied, it is useful to deposit the adhesive or at least one component of the adhesive by way of screen printing, roller printing or pad printing or by way of dispensing deposition, wherein a deposition of the adhesive may be effected in an automated manner whilst using a robot. At the same time it is particularly advantageous if the adhesive, for example a screen printing adhesive, is deposited onto the bipolar plate layer with which this is more easily possible than with the sensitive MEA. With the use of non cross-linking adhesives as well as the use of two-component adhesives of which in each case one component is deposited onto the bipolar plate layer and another component onto the bonding partner, it is furthermore not absolutely necessary for the bipolar plate layer and the bonding partner to be brought together directly after depositing the adhesive or the adhesive components. One advantage of the present invention is also further to be seen in the fact that the bringing-together of the bipolar plate layer and the bonding partner under certain circumstances may be effected also much later after the deposition of adhesive.

With the bipolar plate layer it may be the case of a complete bipolar plate or also a part of such when the bipolar plate itself consists of several layers. Thus preferred embodiments of the invention envisage one bipolar plate being formed of two bipolar plate layers which bear on one another and/or are connected to one another, by which means a cooling layer arises between the bipolar plate layers.

With the at least one bipolar plate layer it may be the case of a part of a graphitic bipolar plate, thus one at least partly consisting of graphite, or of a metallic bipolar plate or also of a completely graphitic or metallic bipolar plate. A metallic bipolar plate which thus completely or partly may consist of metal, may at the same time e.g. be manufactured at least partly of stainless steel. Stainless steel is particularly suitable for the manufacture of bipolar plates on account of its stability and corrosion resistance. In particular, metallic bipolar plates may advantageously be designed such that one bipolar plate is formed in each case of two bipolar plate layers so that a coolant layer with a suitable coolant channel system arises in a simple manner between the two accordingly embossed or shaped bipolar plate layers.

It is particularly advantageous if a bonding connection between the electrolyte membrane or MEA and the bipolar plate layer exists only in an edge region of the bipolar plate layer, thus outside an active area of the electrolyte membrane and the corresponding bipolar plate. By way of this, one ensures a good electrical contact between the MEA and the bipolar plate layer in the active area, which would otherwise be compromised by adhesive. Furthermore an adhesive which is also deposited within the active area could also inhibit a diffusion of reactants and reaction products and thus act in a reaction-inhibiting manner. On the other hand, a deposition of the adhesive or one component of the two-component adhesive only in an edge region of the bipolar plate layer and/or MEA is sufficient in order to manufacture a secure connection between the MEA and the bipolar plate layer and good mutual sealing of both.

A fuel cell arrangement of the described type may in particular be used in an advantageous manner for manufacturing fuel cell stacks which then typically consist of several such fuel cell arrangements which are layered over one another, wherein the fuel cell stack may be terminated by two end plates which in turn are mutually braced in order to hold the fuel cell stack together. At the same time, it is possible, but not absolutely necessary for bonding connections to exist or be created also between the individual fuel cell arrangements forming the fuel cell stack.

A decisive advantage with the manufacture of fuel cell stacks by way of joining together fuel cell arrangements of the described type is to be seen in the fact that with this joining-together, one no longer needs to handle individual electrolyte membranes or MEAs since these are already bonded onto at least one bordering bipolar plate layer. The fuel cell arrangements on assembly of the fuel cell stack then serve as pre-manufactured modules whose assembly no longer causes any difficulties, and with particularly advantageous embodiments of a manufacturing method according to the invention, may even be largely automated or partially automated, for which in turn robots are may be provided. Such a possibly automated, but at least extremely simple assembly of a fuel cell stack by way of joining together modular fuel cell arrangements, in contrast to conventional fuel cell stacks, is not possible according to the state of the art, since with their manufacture, the very supple electrolyte membranes or MEAs which are difficult to handle must be placed individually onto the growing fuel cell stack. The described advantages whilst avoiding the disadvantages of known manufacturing methods at the same time may be realised irrespective of whether it is the case of metallic or graphitic bipolar plates layers or bipolar plates or whether a bonding of the MEAs onto the respective, at least one adjacent bipolar plate layer is effected by a physically bonding adhesive or a pressure-sensitive adhesive.

A particularly advantageous design of the invention envisages the fuel cell arrangements of which several are provided for forming a fuel cell stack, in each case to consist of a bipolar plate and of an MEA bonded onto one side of this bipolar plate. A similarly useful module may then also consist of several bipolar plates and a corresponding number of membrane electrode assemblies which are arranged over one another in an alternating sequence. If bonding connections are also provided between the individual fuel cell arrangements which together form a fuel cell stack, which may be advantageous with regard to a good sealing, then the individual fuel cell arrangements at the same time may be designed in an advantageous manner such that adhesive is deposited on a free-lying surface of the or an outer-lying bipolar plate layer and/or on a free-lying surface of the or an outer-lying MEA of the fuel cell arrangement likewise—preferably only in an edge region—so that a bonding of two fuel cell arrangements may be achieved in a simple manner by way of joining together and where appropriate a pressing of the fuel cell arrangements. In order to prevent a dirtying of a free-lying surface provided with adhesive or an adhesive component, and to permit a packaging or stacked storage of corresponding fuel cell arrangements without bonding, it may be useful to provide this surface with a protective film covering at least the edge region, said film being able to be removed before a joining-together of two fuel cell arrangements. Such a protective film may also be provided temporarily on an individual bipolar plate layer which already carries an adhesive or adhesive component layer, if a deposition of the corresponding MEA is only to be effected at a later period (with a large time interval).

Another embodiment of the invention envisages a fuel cell arrangement which may form a fuel cell stack with other similar fuel cell arrangements, to consist of two bipolar plate layers (e.g. bipolar plate halves) and an electrolyte membrane or MEA, which is arranged there between and bonded to both bipolar plate layers, or of a layering of several such arrangements. Such a design of modules provided for forming a fuel cell stack in particular lends itself with the use of metallic bipolar plates which have a cooling layer arranged between two bipolar plate halves. Then, by way of such, the border surface between two adjacent fuel cell arrangements is formed by the cooling layer. By way of the arrangement of the MEA between two bipolar plates halves, the MEA then lies well protected even before the assembly of the fuel cell stack, by which means damage to the sensitive electrolyte membrane may be avoided. In a similar manner, one may also design fuel cell arrangements or modules for forming fuel cell stacks when the used bipolar plates comprises more than two layers. An individual fuel cell arrangement may then consist of two parts of two adjacent bipolar plates, said parts under certain circumstances against being of several layers, and of an MEA arranged there between and bonded to the adjacent bipolar plate layers, or of a layering of several such arrangements. By way of this it becomes possible to examine the fuel cell arrangements or modules after their manufacture with regard to their leak tightness/sealing and functional reliability, in order subsequently, on construction of the stack, which under certain circumstances may be constructed of several hundred fuel cell arrangements, to ensure an as high as possible functioning reliability.

A retention of the fuel cell stack formed of several such fuel cell arrangements may e.g. be ensured by way of a bracing of the individual fuel cell arrangements, for example between two mutually clamped end plates. As with the previously described embodiments of the invention, here however one may additionally or alternatively provide bonding connections between fuel cell arrangements or modules, which are successive to one another, for which again already before joining together, adhesive may have already been deposited on a free-lying surface or two free-lying surfaces of bipolar plate layers of a fuel cell arrangement, preferably again only in an edge region of the corresponding bipolar plate. Free-lying surfaces of a fuel cell arrangement which are provided with adhesive may thereby be provided with a protective film covering the adhesive, which simplifies a storage, a transport and a handling of the individual fuel cell arrangements and prevents a contamination, and which may be removed before joining together two fuel cell arrangements.

A premanufacture of fuel cell arrangements of the described type as modules for a later assembly of a fuel cell stack, as a further advantage, entails the possibility of previously testing individual fuel cell arrangements which are subsequently joined together for forming a fuel cell stack, and to examine these with regard to leakages. Thus for example one may ascertain leakages at a very early stage, for example between two adjacent layers in an edge region of the fuel cell arrangement, and damage, for example fractures in an electrolyte membrane. By way of an early diagnosis of such and other errors, one may avoid an unnecessarily high rejection rate or increased expense on manufacture, which results if such an examination may only be carried out with the finished fuel cell stack, which is the case with conventional arrangements according to the state of the art. With regard to this, one advantageous method for manufacturing a fuel cell stack by way of joining together several fuel cell arrangements envisages the individual fuel cell arrangements being tested and checked with regard to leaks before the joining-together.

BRIEF DESCRIPTION OF THE DRAWINGS

Embodiment examples of the invention are explained hereinafter by way of the FIGS. 1 to 4. There are shown in.

DETAILED DESCRIPTION

Figure 1:
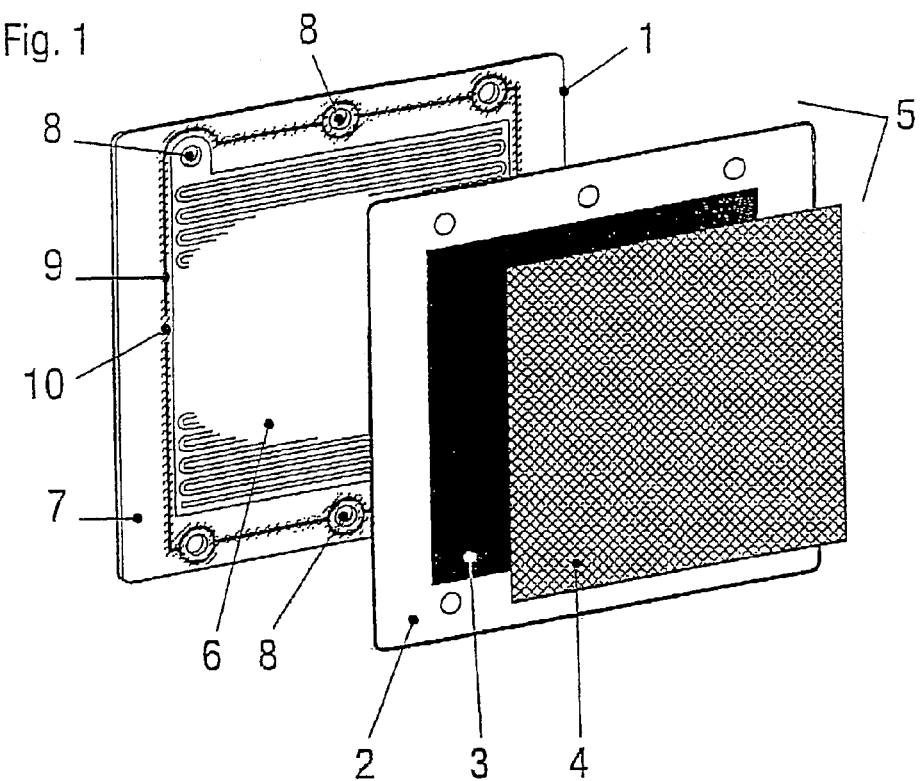
FIG. 1 a fuel cell arrangement according to the invention, in an exploded representation, FIG. 2 in a corresponding representation, another fuel cell arrangement according to the invention, FIG. 3 a similar fuel cell arrangement in the joined-together condition, FIG. 4 a perspective view of a fuel cell stack according to the invention and FIG. 5 in five different embodiments, in each case a perspectively represented cut-out of a bipolar plate layer for fuel cell arrangements according to the invention.

In FIG. 1, one may recognise a bipolar plate layer 1 which is given here by a complete metallic bipolar plate of a stainless steel, and a polymer membrane 2 which together with two catalyser layers 3 of which only one may be recognised, and further layers 4, forms a so-called membrane electrode assembly or MEA 5. The MEA 5 in the terminology used here thus apart from the polymer membrane 2 should also include the catalyst layers 3 and the further layers 4. With regard to the further layers 4 it is the case here of gas diffusion and electrode layers, wherein the further layer 4, which for an improved overview in FIG. 1 is shown lifted from the polymer membrane, together with the polymer membrane 2 and the catalyser layers 3, forms an assembly, specifically the MEA 5.

The further layers 4 are furthermore to be understood as being optional. Embodiments of the invention with which one makes do without gas diffusion layers, and/or with which the respective bearing bipolar plate also assumes the function of the gas distribution are also conceivable. Embodiments of the invention constructed in an analogous manner with which the bipolar plate layer 1 forms a graphitic bipolar plate are also conceivable.

One may further recognise in FIG. 1 that the bipolar plate layer 1 in an active region 6 comprises a channel system via which a reactant is supplied to the electrolyte membrane 5 and reaction products may be transported away. Openings 8 recognisable in an edge region 7 of the bipolar plate layer 1, to which recesses in the electrolyte membrane 5 correspond, again form channels orientated perpendicularly to the bipolar plate layer 1, for the supply of reactants, the removal of reaction products as well as the supply and removal of a coolant. A three-dimensional sealing structure 9 is also shown in FIG. 1 which may be formed of a metallic bead, an elastomer and/or a bead sealing lip and which in combination with an adhesive layer 10 serves for sealing the bipolar plate layer 1 to the MEA 5. In particular an elastomer bead or also another molded elastomer seal, for example a sealing lip—possibly together with a metallic bead or several beads—may serve as three-dimensional sealing structures 9. Examples for the shaping of the three-dimensional sealing structure 9 are explained in a more detailed manner below by way of FIG. 5.

It is now envisaged for the MEA 5 to be bonded onto the bipolar plate 1 with a physically bonding adhesive or pressure-sensitive adhesive. In the case of the use of a pressure-sensitive adhesive, thereby a permanently sticky adhesive should be used which consists of a mixture of a rubber (e.g. natural or synthetic rubber, polyacrylates, polyester, polychloroprene, polyvinyl ether and/or polyurethane and/or flouropolymer rubber) and of a rosin (with a so-called tackifier, i.e. a modified natural rosin—for example colophony—or artificial resins for example polyester resin, phenol resin). In each case, the bonding takes place without a curing having to be induced externally.

The adhesive or the corresponding adhesive component at the same time is only deposited in the edge region 7 of the bipolar plate layer 1. Thereby, it is envisaged for the adhesive to be deposited by way of screen printing, roller printing or pad printing or by way of a dispensing method, in the edge region 7 of the bipolar plate layer 1 and as the case may be in the corresponding edge region of the electrolyte membrane, over the whole corresponding surface, and to form the adhesive layer 10, wherein the three-dimensional sealing structure 9 with a subsequent joining-together of the bipolar plate layer 1 and the MEA 5 elastically deforms and is partly pressed into the MEA 5, so that an almost complete bond connection between the bipolar plate layer 1 and the MEA 5 comes into being in the edge region 7. In the same manner, it would also be possible to only deposit the adhesive on prominences of the three-dimensional sealing structure 9 which are formed e.g. by a bead or a molded rubber seal, so that a bonding connection only comes into being in regions of these prominences.

A fuel cell arrangement arises by way of joining together the bipolar plate layer 1 and the MEA 5. This fuel cell arrangement forms a module which with a number of further similar modules by way of stacking onto one another, is suitable for forming a fuel cell stack of several fuel cells connected in series.

It is also conceivable for a module, for forming a fuel cell stack by way of joining together with further modules, for its part to consist already of a layering of several arrangements of the type shown in FIG. 1. With this, again bonding connections which are realised in exactly the same manner as with the bonding connection between the bipolar plate layer 1 and the MEA 5, may be provided between the individual arrangements of the type shown in FIG. 1 and/or between the individual modules. For this, it is envisaged for a likewise non-curing adhesive (physically bonding or pressure-sensitive adhesive) to be deposited on a side of the bipolar plate layer distant to the MEA 5 and/or on a side of the MEA 5 distant to the bipolar plate layer 1, wherein these surfaces in turn are provided with the protective films covering the adhesive or the adhesive components, which are to be removed before a joining-together of the individual modules. Finally it is envisaged for the fuel cell arrangement which is shown in an exploded manner in FIG. 1 to be examined as to errors and in particular with regard to leakages before joining together with further such fuel cell arrangements. The same applies to a module consisting of several such arrangements, before assembly of such modules into a fuel cell stack.

Figure 2:
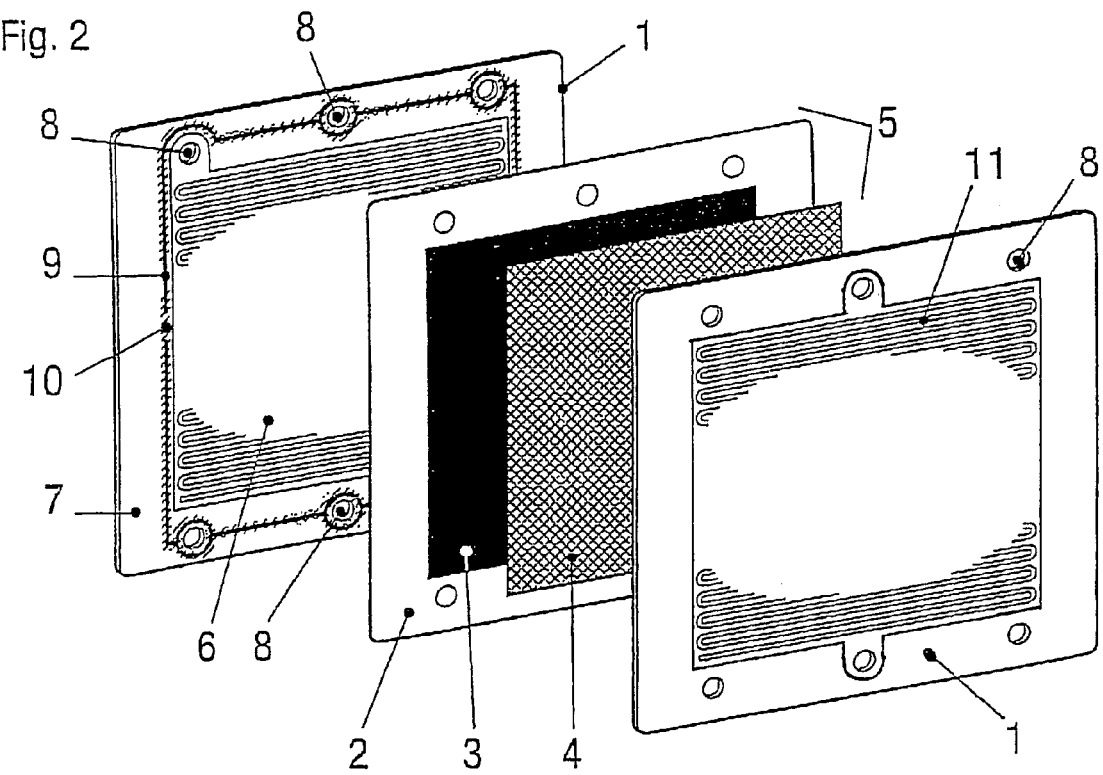

In a representation according to FIG. 1, another embodiment of the fuel cell arrangement according to the invention is shown in FIG. 2. Here, recurring features are provided with the same reference numerals and inasmuch as what has been said is still the case, these are no longer explained in detail. Differing from the fuel cell arrangement shown in FIG. 1, the fuel cell arrangement pictured in FIG. 2 consists of two bipolar plate layers 1 and of an MEA 5 which is arranged between the two bipolar plate layers 1. At the same time, the MEA 5 when joining together the imaged fuel cell arrangement is bonded to two bipolar plate layers 1, wherein in each case a bonding connection of the previously described type is provided between the MEA 5 and the bipolar plate layers 1. With regard to the bipolar plate layers 1 it is here the case in each case only of one bipolar plate half of stainless steel, of which two form a complete bipolar plate, wherein between two bipolar plate halves forming a bipolar plate, a channel system for a coolant arises on account of a suitable embossing 11 of the bipolar plate layers 1. Again a corresponding fuel cell arrangement with two graphitic instead of metallic bipolar plate layers 1 would also be conceivable.

Figure 3:
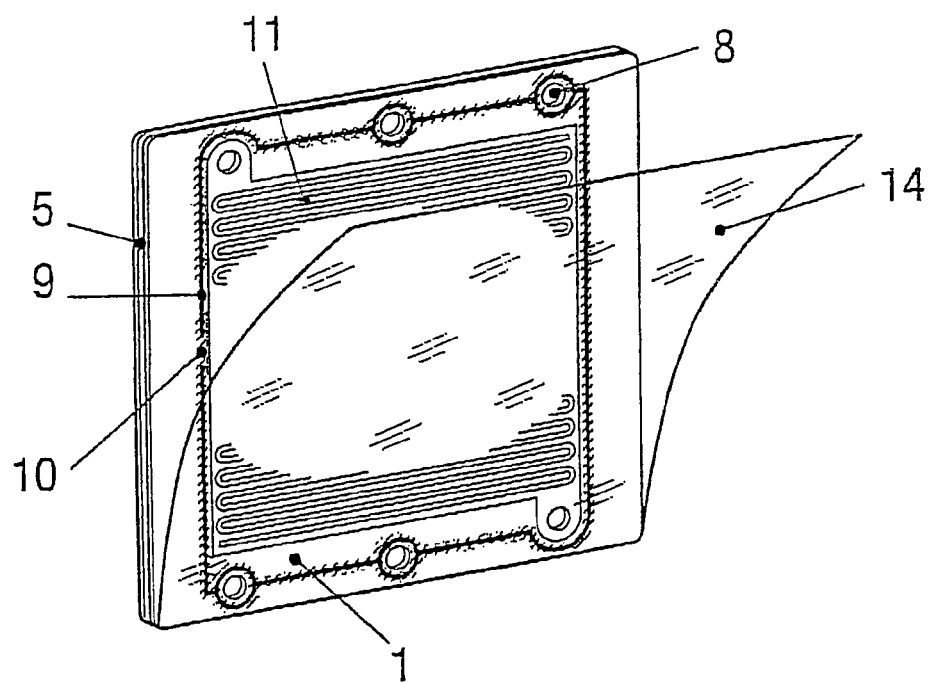

FIG. 3 shows a fuel cell arrangement in the assembled condition, which results by way of supplementing the fuel cell arrangement of FIG. 1 by a further bipolar plate. This fuel cell arrangement is also conceived as a module, and with further corresponding modules is envisaged to form a fuel cell stack, wherein the modules are layered over one another. Thereby, with the imaged embodiment example, bonding connections are also provided between individual modules, for which at least one of the two bipolar plate layers 1 also on a free-lying side distant to the MEA 5, in the edge region 7, is provided with an adhesive layer 10 of a physically bonding adhesive or pressure-sensitive adhesive, wherein a removable protective film 14 which here is shown partly removed, covers the adhesive or the adhesive component.

It is of course also possible for a module to consist of a layering of two or more fuel cell arrangements of the type shown in FIG. 2.

Figure 4:
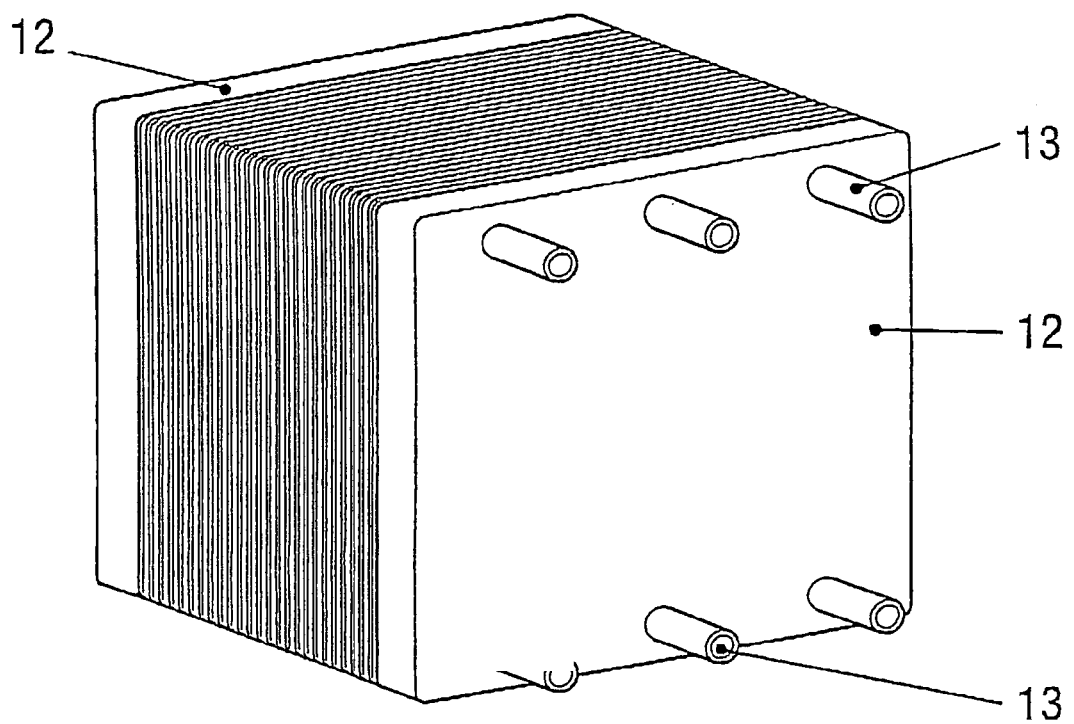

Finally a fuel cell stack is to be seen in FIG. 4, which consists of a layering of several fuel cell arrangements of the type previously described by way of FIGS. 2 and 3, as well as of two end plates 12, wherein the fuel cell arrangements are arranged between the two end plates 12. The two end plates 12 are braced against one another so that they provide the fuel cell stack with a retention additionally to the bonding connection. Finally, in FIG. 4, one may also recognise conduit connections 13 for the supply of reactants and for the transport away of reaction products, as well as for the supply and removal of the coolant. Also, a fuel cell stack of modules which are formed by fuel cell arrangements as are designed as shown in FIG. 1, does not externally differ from the fuel cell stack shown in FIG. 4.

The bipolar plates which form the fuel cell stack, and/or the corresponding membrane electrode assemblies or electrolyte membranes, in the described manner, are provided with a permanently adhesive layer 10 or one which bonds spontaneously (automatically) when adding together individual components, by which means it becomes possible to manufacture modules which when building up the fuel cell stack, only need to be freed of the protective films and may be subsequently built in a simple, safe and compact manner. If the bipolar plate layers 1 have been connected to the membrane electrode assembly 5 already before the assembly of the fuel cell stack, one obtains modules of which at the most only one per cell need to be added on assembly of the fuel cell stack. Thus the construction of the fuel cell stack is significantly simplified by way of a higher integration of the components, and a higher processing stability is achieved. One also achieves an automation of the stack construction by way of the modularisation, since the joining-together of the modules may also be effected with the help of a robot.

It is therefore envisaged by way of screen printing, roller pointing or pad printing or by way of a dispensing method to deposit a layer of an adhesive material such as screen printing adhesive, and specifically in the edge region 7 and in particular on the sealing structures 9, onto bipolar plate layers 1 which are suitable of effectively sealing media present in the fuel cell by way of suitable structure features, specifically the three-dimensional sealing structures 9 formed of bead and molded rubber seals. The adhesive material is characterised by the fact that (possibly after evaporating off a solvent or by way of reaction with the substrate material) it bonds (under circumstances crosslinked in a substrate-bonding manner) onto the bipolar plate layers 1 in an adequately firm manner, and over a longer period of time is in the position of assuming an adhesive connection to further components, i.e. bonding partners. The permanently tacky layer permits further parts of the fuel cell (e.g. the MEA 5) to be fixed on the bipolar plate layer 1 immediately after its application or also later, for example on assembly of the stack. The handling of the MEAs 5 is significantly simplified by way of this, and the sealing effect of the bipolar plate is improved.

The resulting construction of the sealing structure 9 and the adhesive coating or adhesive layer 10 is characterised by a higher resistance and durability with respect to media typical of fuel cells, by which means a good sealing may be achieved in the constructed condition over the lifetime of the fuel cells. By way of the connection of the bipolar plate or bipolar plate layer 1 and MEA 5, one produces a multi-layer module which permits the automation of the construction of the fuel cell stack, and the which simplifies handling of the sensitive membranes electrolyte or electrode membrane assemblies 5.

Figure 5:
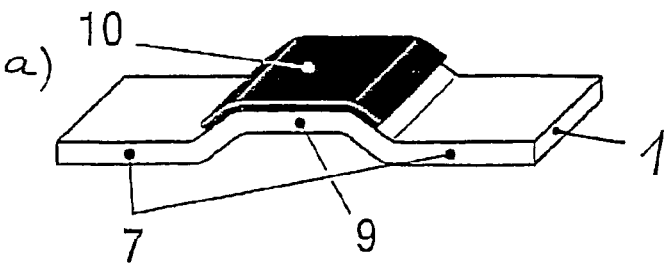
Figure 5:
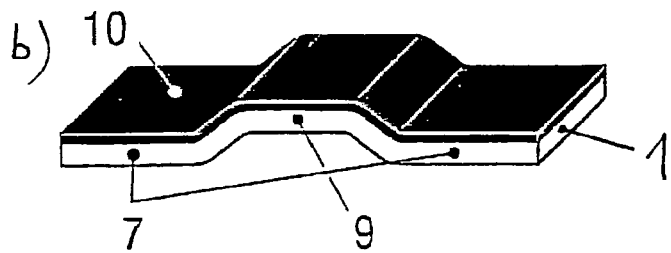
Figure 5:
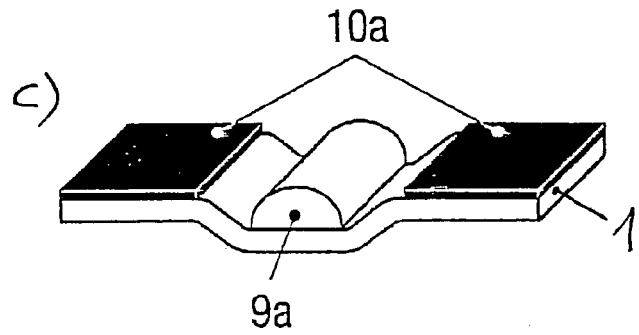
Figure 5:
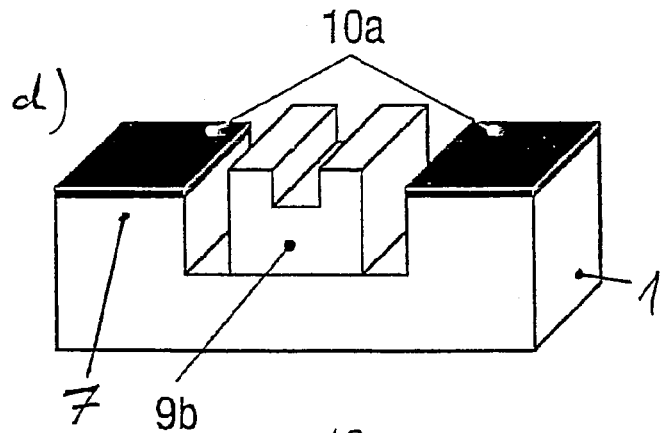
Figure 5:
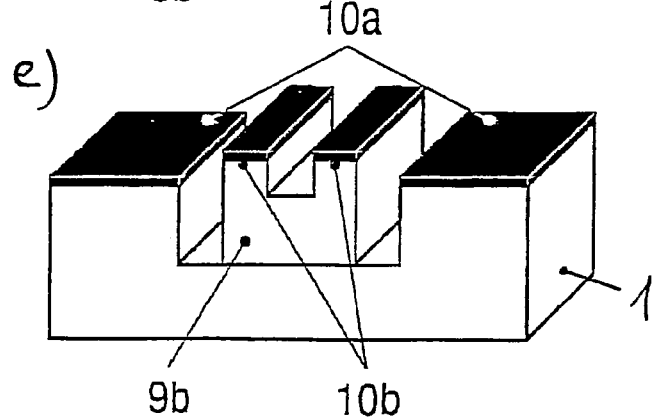

Possible designs of three-dimensional sealing structures 9 and adhesive layering deposited onto the corresponding bipolar plate layer 1 are represented for different embodiments of the invention in FIG. 5.

FIG. 5a) shows the edge region 7 of a metallic bipolar plate layer 1 which as a sealing structure 9 has a simple metallic bead which is peripheral in the vicinity of an edge of the bipolar plate layer 1, wherein only this bead is coated with an adhesive layer 10. A corresponding cut-out of a similar bipolar plate layer 1 is shown in FIG. 5b, wherein the only difference is the fact that the adhesive layer 10 here is deposited over the whole surface in the edge region 7. It would of course also be conceivable to leave out the adhesive layer 10 on the bead. A slightly different, likewise metallic bipolar plate layer 1 is shown in FIG. 5c), with which a rubber bead 9a is arranged in a groove and together with this forms a three-dimensional sealing structure. An adhesive layer 10a here is deposited in regions which surround this sealing structure.

FIG. 5d) shows a corresponding cut-out of a graphitic bipolar plate layer 1 with which a molded rubber seal 9b which for its part comprises two lips, is arranged in a groove, wherein an adhesive layer 10 is deposited outside this groove in an edge region 7 of the bipolar plate layer 1. A comparable bipolar plate layer 1 is also to be seen in FIG. 5e), wherein an adhesive layer 10b is additionally arranged on the molded rubber seal 9b.

The adhesive layers 10, 10a, 10b may again be given by a pressure-sensitive adhesive or a physically bonding adhesive. Of course the features shown in FIG. 5a) to 5e) may also be combined and be realised with bipolar plate layers 1 which are different than the bipolar plate layers 1 shown in each case. Furthermore also elastomer beads or molded seals of other elastomers may be used instead of rubber beads 9a or molded rubber seals 9b.

The invention claimed is:

1. A fuel cell comprising:
   at least one bipolar plate layer;
   at least one membrane electrode assembly proximate said at least one bipolar plate layer;
   an adhesive in direct contact with both said bipolar plate layer and said at least one membrane electrode assembly to bond them together;
   a three-dimensional sealing structure formed from both said at least one bipolar plate layer and at least one metallic bead for sealing said membrane electrode assembly and said bipolar plate layer to one another, said adhesive comprising a separate layer from said three-dimensional sealing structure.

2. The fuel cell of claim 1, wherein said adhesive is a fluid applied adhesive, but not a bonding tape or an adhesive tape.

3. The fuel cell of claim 2, wherein said adhesive is at least one of a pressure-sensitive adhesive and a physically bonding adhesive.

4. The fuel cell of claim 2, wherein said adhesive is disposed on at least one of said three-dimensional sealing structure and at least one edge region of said at least one bipolar plate layer.

5. The fuel cell of claim 2, wherein said adhesive bonds in a pressure sensitive manner and not cross linking by curing.

6. The fuel cell of claim 2, wherein said adhesive includes at least one of a rubber, an under cured rubber, and a rosin.

7. The fuel cell of claim 2, wherein said adhesive is deposited onto at least one of a prominence of said three-dimensional sealing structure, an edge region of said sealing structure, and an entire surface of said sealing structure.

8. The fuel cell of claim 1, wherein said bipolar plate layer is one of a graphitic bipolar plate, a metallic bipolar plate, at least a partial graphitic bipolar plate, and at least a partial metallic bipolar plate.

9. The fuel cell of claim 1, wherein said membrane electrode assembly is bonded to said at least one bipolar plate layer at only an edge region of said bipolar plate.

10. The fuel cell of claim 1, wherein said fuel cell includes a corresponding number of membrane electrode assemblies to said at least one bipolar plate layer.

11. The fuel cell of claim 1, wherein said fuel cell includes said electrode membrane assembly disposed between two of said at least one bipolar plate layer, said electrode membrane assembly being bonded to each of said two of said at least one bipolar plate layer.

12. A method of manufacturing a fuel cell comprising:
   providing at least one bipolar plate layer;
   applying an adhesive on the at least one bipolar plate layer;
   placing a membrane electrode assembly proximate said at least one bipolar plate layer;
   bonding said membrane electrode assembly to said bipolar plate layer with said adhesive on said bipolar plate layer;
   sealing said membrane electrode assembly and said at least one bipolar plate layer to one another with a three-dimensional sealing structure formed from both said at least one bipolar plate layer and at least one metallic bead, said adhesive comprising a separate layer from said three-dimensional sealing structure.

13. The method of manufacturing a fuel cell of claim 12, wherein said bonding includes using at least one of a pressure-sensitive adhesive and a physically bonding adhesive.

14. The method of manufacturing a fuel cell of claim 12, further comprising depositing said adhesive on at least one of said three-dimensional sealing structure and at least one edge region of said at least one bipolar plate layer.

15. The method of manufacturing a fuel cell of claim 14, wherein said depositing said adhesive includes at least one of screen printing, roller printing, pad printing, and dispensing.

16. The method of manufacturing a fuel cell of claim 12, further comprising coating said membrane electrode assembly on a side distant a first of said at least one bipolar plate with at least one of a pressure-sensitive adhesive and a physically bonding adhesive.

17. The method of manufacturing a fuel cell of claim 12, further comprising said membrane electrode assembly, which is not coated on a side facing a first of said at least one bipolar plate, with at least one of a pressure-sensitive adhesive and a physically bonding adhesive.

18. A fuel cell comprising:
    at least one bipolar plate layer;
    an adhesive layer in direct contact with said at least one bipolar plate layer;
    a membrane electrode assembly applied directly to said adhesive layer to bond said at least one bipolar plate layer with said membrane electrode assembly; and
    a three-dimensional sealing structure comprising a groove formed from both said at least one bipolar plate layer and at least one metallic bead for sealing said membrane electrode assembly and said bipolar plate layer to one another.

19. The fuel cell of claim 18, wherein a molded rubber seal is located within said groove.

20. The fuel cell of claim 18, wherein a rubber bead is located within said groove.

21. The fuel cell of claim 18, wherein said bipolar plate layer is metallic.

22. The fuel cell of claim 18, wherein said adhesive layer covers said three-dimensional sealing structure.

23. The fuel cell of claim 18, wherein said adhesive layer covers both said three-dimensional sealing structure and edge regions on either side of said three-dimensional sealing structure.

24. The fuel cell of claim 18, wherein said adhesive layer covers only edge regions on either side of said three-dimensional sealing structure but not said sealing structure itself.

25. The fuel cell of claim 18, wherein said adhesive layer has a thickness of 1 to 50 µm.

26. The method of manufacturing a fuel cell of claim 12, wherein said adhesive layer is applied in a fluid manner.

27. The fuel cell of claim 1, wherein said three dimensional sealing structure comprises a groove bounded by edge regions formed from said bipolar plate layer.

* * * * *